April 2, 1968   J. A. WATKINS   3,376,569
BINARY SIGNAL RESPONSIVE ELECTROMAGNETIC INDICATOR
Filed Sept. 27, 1965   6 Sheets-Sheet 1
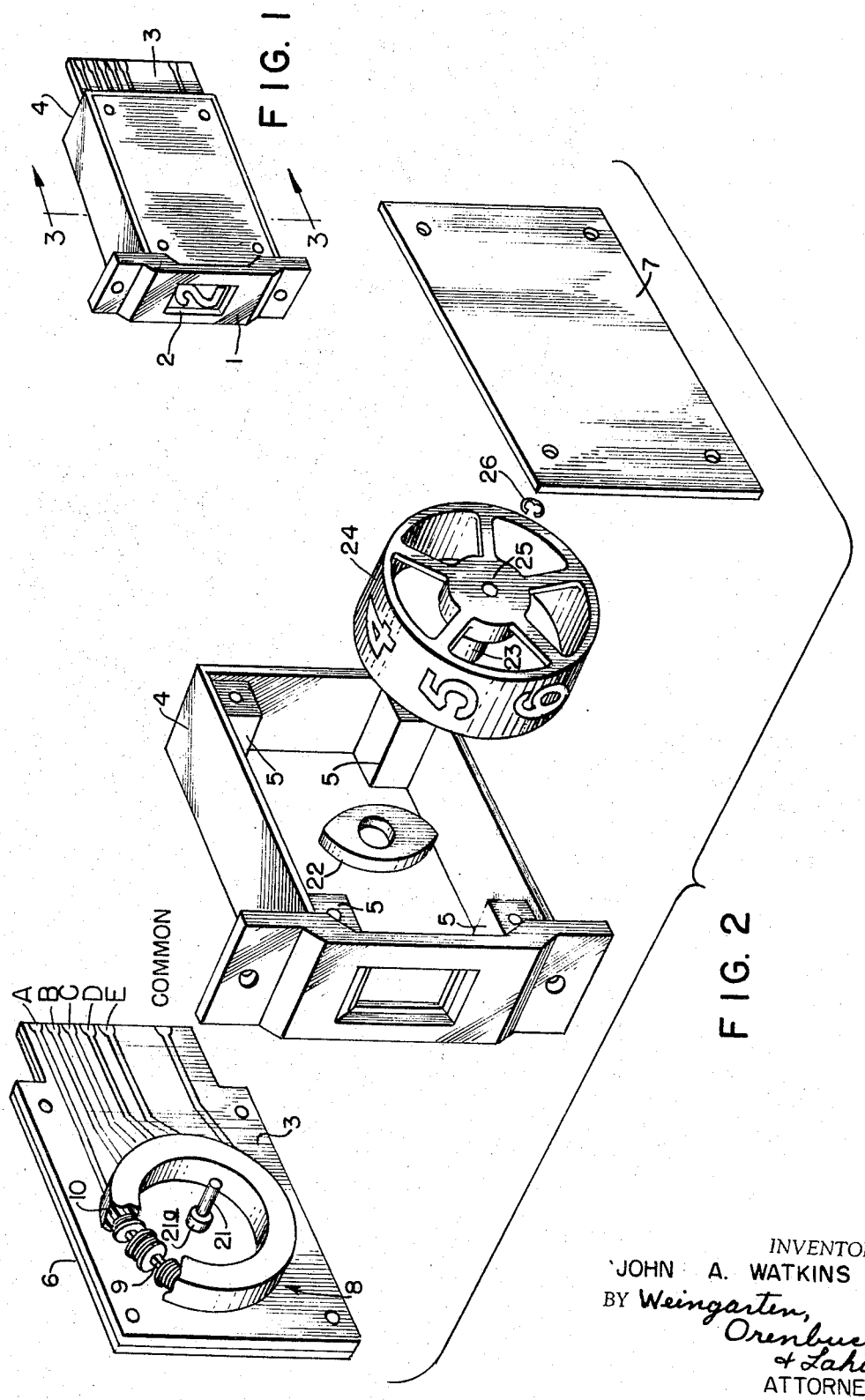
INVENTOR.
JOHN A. WATKINS
BY Weingarten,
Orenbuch
& Lahive
ATTORNEYS INVENTOR.
JOHN A. WATKINS
BY Weingarten,
Orenbuch
& Lahive
ATTORNEYS

| DECIMAL DIGIT | BINARY CODE | | | |
|---|---|---|---|---|
| | D | C | B | A |
| 0 | 0 | 0 | 0 | 0 |
| 1 | 0 | 0 | 0 | 1 |
| 2 | 0 | 0 | 1 | 0 |
| 3 | 0 | 0 | 1 | 1 |
| 4 | 0 | 1 | 0 | 0 |
| 5 | 0 | 1 | 0 | 1 |
| 6 | 0 | 1 | 1 | 0 |
| 7 | 0 | 1 | 1 | 1 |
| 8 | 1 | 0 | 0 | 0 |
| 9 | 1 | 0 | 0 | 1 |

April 2, 1968          J. A. WATKINS          3,376,569

BINARY SIGNAL RESPONSIVE ELECTROMAGNETIC INDICATOR

Filed Sept. 27, 1965          6 Sheets-Sheet 4

INVENTOR.
JOHN A. WATKINS
BY Weingarten,
Orenbuch
+ Lahive
ATTORNEYS

April 2, 1968          J. A. WATKINS          3,376,569
BINARY SIGNAL RESPONSIVE ELECTROMAGNETIC INDICATOR
Filed Sept. 27, 1965          6 Sheets-Sheet 5

INVENTOR.
JOHN A. WATKINS
BY Weingarten,
Orenbuch
& Lahive
ATTORNEYS

April 2, 1968  J. A. WATKINS  3,376,569
BINARY SIGNAL RESPONSIVE ELECTROMAGNETIC INDICATOR
Filed Sept. 27, 1965  6 Sheets-Sheet 6
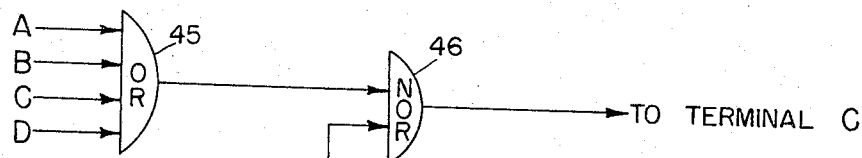
F I G. 11
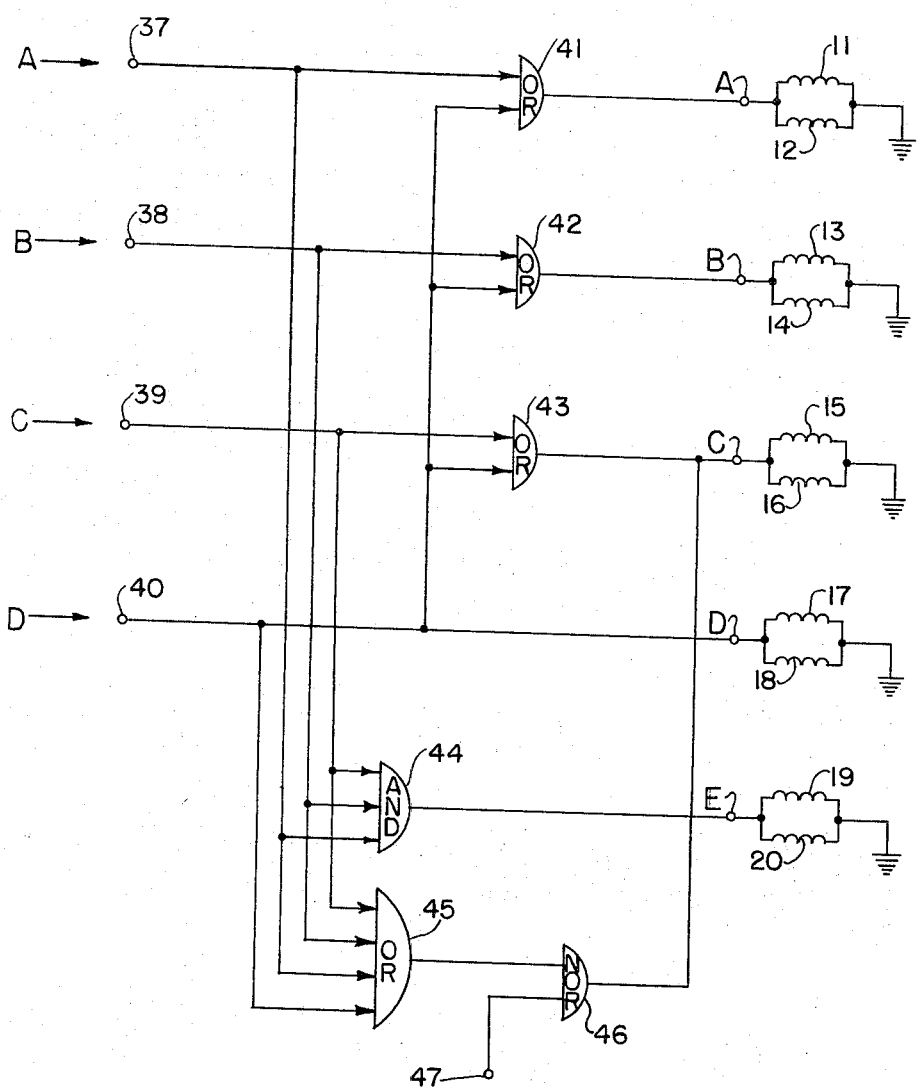
F I G. 12
INVENTOR.
JOHN A. WATKINS
BY Weingarten,
Ostrolenk,
& Sahin
ATTORNEYS United States Patent Office 3,376,569
Patented Apr. 2, 1968

3,376,569
BINARY SIGNAL RESPONSIVE ELECTRO-
MAGNETIC INDICATOR
John A. Watkins, Cheshire, Conn., assignor to Patwin,
Inc., a corporation of Connecticut
Filed Sept. 27, 1965, Ser. No. 490,385
3 Claims. (Cl. 340—3)

This invention relates in general to apparatus for converting from one numeric system to a different numeric system. More particularly, the invention pertains to devices for converting coded electrical signals into a decimal display and resides in an electromagnetic indicator arranged to respond to binary coded electrical signals by displaying the symbol in the decimal system that is equivalent to the value of the binary coded signals.

The conventional electromagnetic indicator that is capable of displaying the ten decimal symbols, i.e., 0, 1, 2, 3 . . . 9, employs a stator having ten electromagnets. Each electromagnet is arranged to be separately energized by an electrical signal, and, in response to the electrical input, causes a different one of the decimal numerals to be displayed in the window of the indicator. As each electromagnet of the stator must be separately electrically energized, the conventional decimal indicator has ten separate electrical inputs which must be coupled to the source of electrical signals in a manner that causes the correct decimal symbol to be displayed.

In some applications where electromagnetic decimal indicators are employed, the signal source provides electrical signals that are coded according to a binary numeric system. In a binary code, as the name indicates, each "bit" in the code can have but one of two values. In binary parlance, the two values are commonly designated ONE and ZERO; if the value of a bit is not ONE, it must be ZERO, as that is the only other permissible value. Where the code consists of a set of simultaneous electrical signals, each signal of the set is a "bit" and must have either one of the two values. A binary ONE for example, can correspond to the presence of an electrical potential whereas the binary ZERO can correspond to the absence of an electrical potential.

The conventional ten input electromagnetic decimal indicator, when used in a situation where the electrical signals are coded in accordance with a binary system, requires the interposition of a decoding device to translate the binary signals into signals compatible with the input arrangement of the indicator. The decoding device, because of the time required to translate the electrical signals, introduces an undesirable lag in the conversion of the binary coded signals to a decimal display. From the view point of reliability, a decoding device is undesirable because while the electromagnetic indicator is a mechanism having few parts that can fail, the decoding device usually has a multitude of components which may fail. Further, a decoding device, due to its complexity, tends to be expensive and may cost more than the electromagnetic indicator itself.

In converting binary coded electrical signals into their decimal equivalents, the primary object of the invention is to eliminate the interposed decoding device by providing an electromagnetic indicator which operates with a simple signal gating arrangement.

The electromagnetic indicator of the invention utilizes a stator having main and auxiliary windings mounted upon an annular ferromagnetic core. The windings are connected in pairs and arranged so that when a pair of windings is electrically energized a discretely oriented magnetic field is established externally of the core. That is, each pair of windings, when electrically excited, establishes an external magnetic field whose orientation is different from the orientation of the magnetic field that is established by any other pair of windings on the core. When two pairs of windings are concurrently energized, the direction and magnitude of the external magnetic field is the resultant of the magnitudes and orientations of the magnetic fields established by each pair of windings. Where the binary coded electrical signals require one pair of main windings to be energized or two pair of main windings to be concurrently energized, the binary coded electrical signals are applied directly to the main windings. Where the binary coded electrical signals normally required three pairs of main windings to be energized, a gating arrangement prevents those signals form being applied directly to the main windings and instead causes an auxiliary pair of windings on the stator to be energized. Similarly, where the binary coded electrical signals normally require none of the main windings to be energized, the gating arrangement causes a pair of windings on the stator to be energized. Because of the gating arrangement, no more than two pairs of windings need be electrically energized to establish any magnetic field orientation required for the display of the decimal equivalent of the binray code. The electromagnetic indicator of the invention employs a rotor having a permanent magnetc secured to a drum. The permanent magnet is encircled by the stator's annular core and the rotor is mounted in a manner permitting the permanent magnet to turn into alignment with the external magnetic field established by the stator. The drum, being fixed to the permanent magnet, assumes a stationary position whenever the magnet is aligned with the stator's field. On the periphery of the drum, symbols, such as arabic numerals, are arranged in positions where a symbol is present in the window of the indicator when the permanent magnet is in a field aligned position. For each aligned position of the permanent magnet, a different symbol can be displayed in the window.

The invention, both as to its construction and mode of operation, can be better understood from the following exposition when considered in conjunction with the accompanying drawings in which:

FIG. 1 depicts an embodiment of the invention in assembled form;

FIG. 2 is an exploded view of the embodiment showing its component parts;

Figures 5, 6:
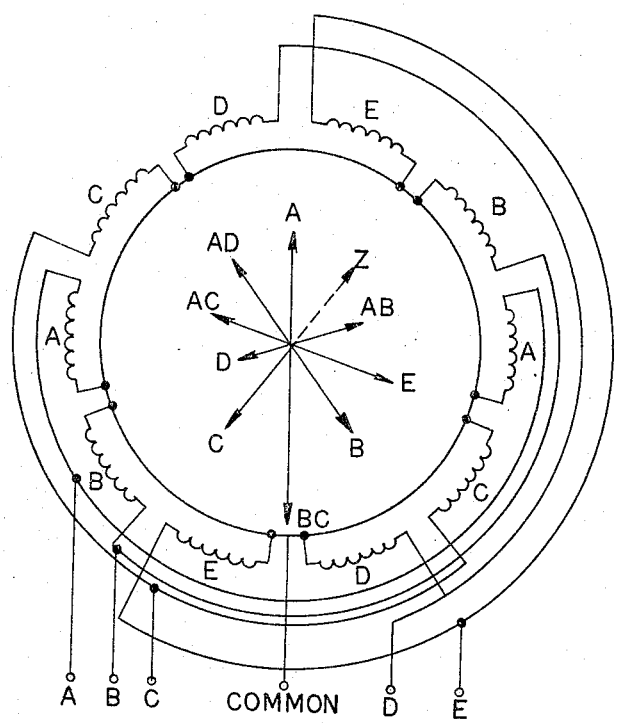
FIG. 5 depicts the scheme of the stator employed in the invention to accommodate a four bit binary code.
Figure 7:
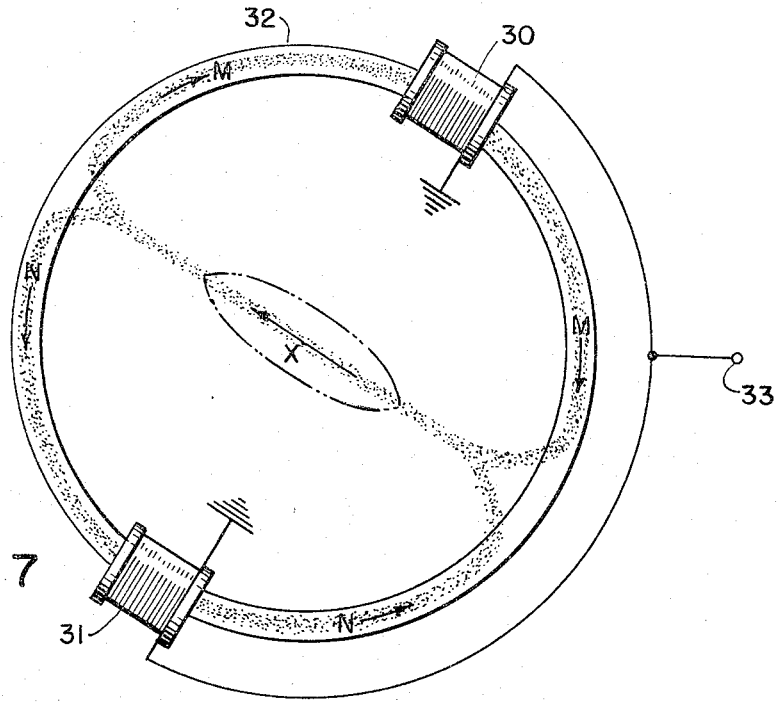
Figure 8:
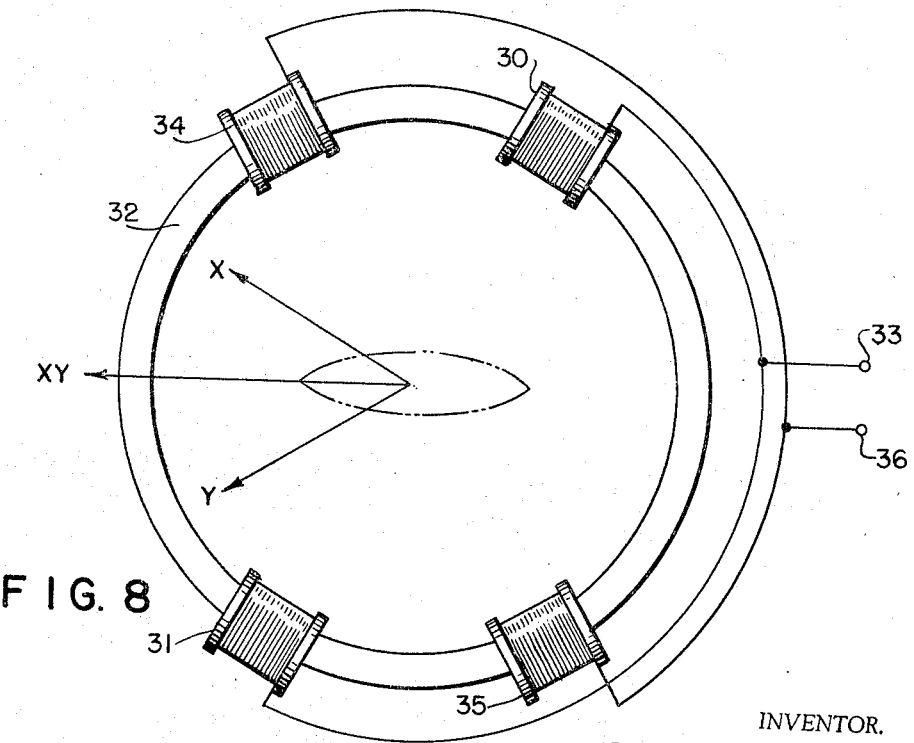
Figure 9:
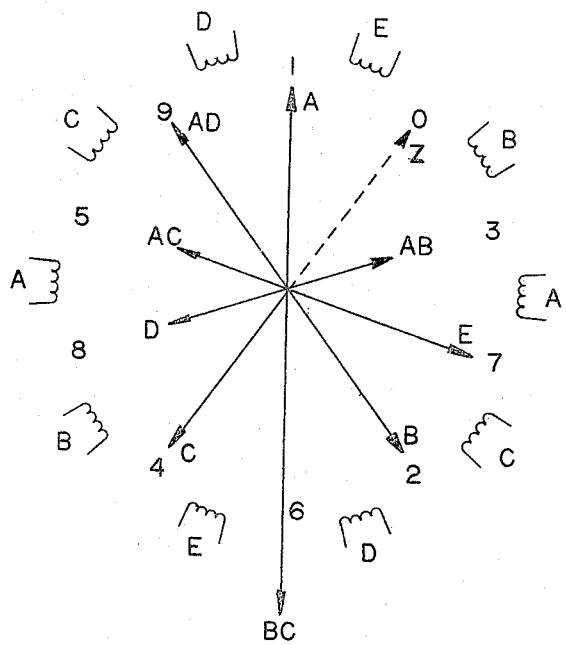
Figure 10:
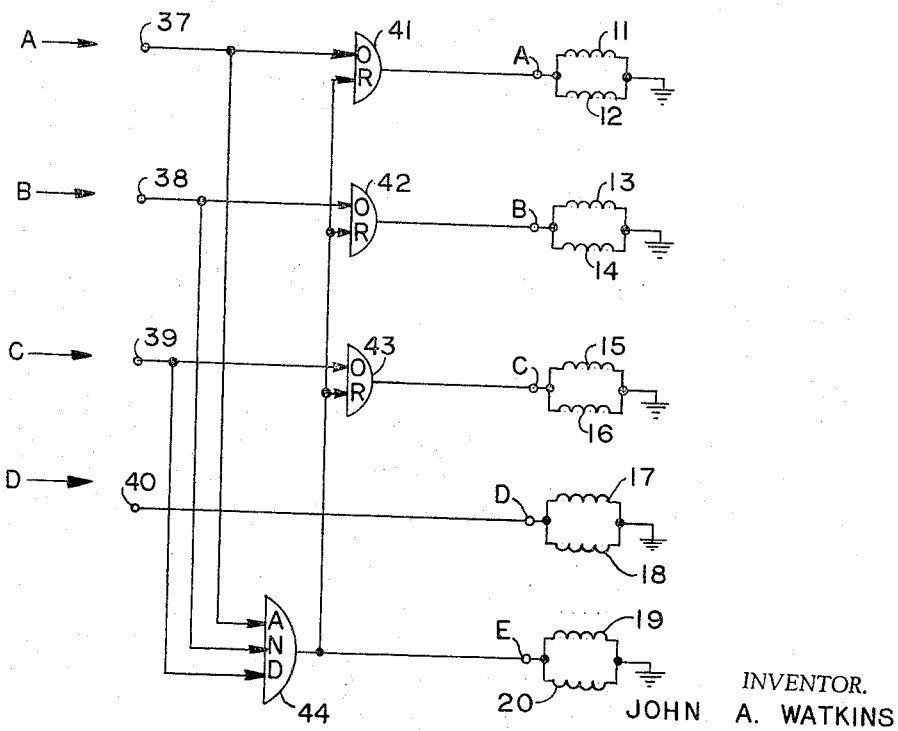

FIG. 6 tabulates the standard binary code with respect to its decimal equivalent value;

FIG. 7 illustrates a rudimentary stator employing a single pair of windings and shows the magnetic flux paths established by the electrical excitation of those windings;

FIG. 8 depicts the rudimentary stator to which a second pair of windings have been added and illustrates the resultant magnetic field vector established by the simultaneous energization of both pairs of windings;

FIG. 9 shows the direction and magnitude of the vectors representing the magnetic fields established by the FIG. 5 stator;

FIG. 10 shows a signal gating arrangement for energizing a pair of auxiliary windings when the standard binary code would normally require the energization of there pairs of main windings;

FIG. 11 shows a signal gating arrangement for energizing a pair of windings when the standard binary code would normally not cause the energization of any main windings; and FIG. 12 depicts the manner in which the signal gating arrangement of FIG. 11 may be combined with the signal gating arrangement of FIG. 10.

The indicator depicted in FIG. 1 of the drawings employs a front panel 1 having a window 2 in which symbols, such as numerals, are displayed. Electrical signals are impressed upon the indicator through the terminals of a printed circuit board 3 that extends from the rear of the indicator housing. The terminals of the printed circuit board, as shown in FIG. 2 are designated A ,B, C, D, E, F, and COMMON.

Figure 3:
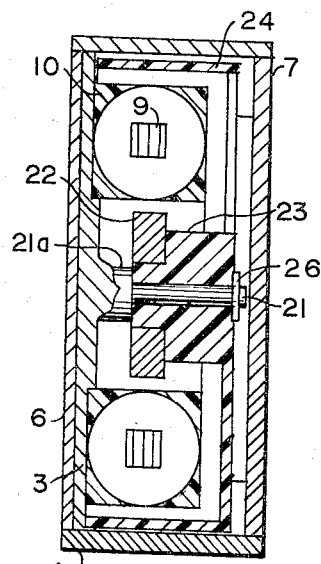
FIG. 3 is a sectional view of the embodiment taken along the plane 3—3 of FIG. 1.
Figure 4:
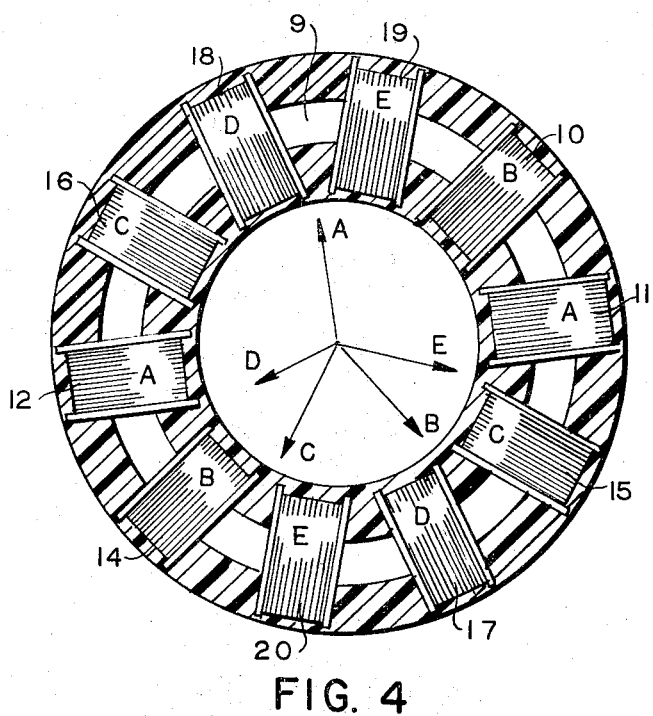
FIG. 4 depicts the arrangement of the winding on the core of the stator.

The housing, as illustrated in FIG. 2, employs a hollow rectangular body 4 having posts 5 at its corners. The front panel, preferably is an integral part of the body 4. The posts are internally threaded and when the indicator is assembled, end plates 6 and 7 are secured to opposite sides of body 4 by screws which engage the threaded posts. Printed circuit board 3 has its wiring protected by an insulative coating and the board is preferably clamped against body 4 by end plate 6. As several indicators may be mounted side by side or an indicator may be used in an environment where external magnetic fields of appreciable strength are present, the end plates are, preferably, fabricated of a material of high magnetic permeability to act as magnetic shields. Secured to circuit board 3 is a stator 8 having a ferromagnetic core 9 carrying a plurality of electromagnetic windings. The core and its windings are preferably embedded or "potted" in a plastic matrix 10 which seals the electrical components against moisture and insures that the windings are rigidly held in place. The core 9 is preferably constructed as indicated in FIG. 3 of laminations, for ease of manufacture. The core and its windings form a stator whose purpose is to establish any one of a plurality of discretely oriented magnetic fields. Ten electromagnetic windings 11, 12, 13 . . . 20 are disposed around the core 9, as shown in FIG. 4 with each winding encircling a portion of the core.

Secured to circuit board 3 and extending through the geometric center of annular stator 8 is a shaft 21. In the assembled apparatus, depicted in FIG. 3, a rotor is mounted to turn about the shaft. The rotor, shown in FIGS. 2 and 3, employs a permanent magnet 22 attached to the hub 23 of a drum 24. The periphery of the drum is marked with the symbols that are to be displayed in the window of the indicator. Usually the symbols are alphanumeric characters and are of a size permitting only one character at a time to be fully presented or registered in the window. For the purpose of this exposition, the symbols in the embodiment are arabic numerals and all ten decimal numerals are marked on the periphery of the drum. The permanent magnet is rigidly attached to the drum so that the two members constitutes a rotor that turns as an integral unit. The drum has a central aperture 25 which permits the rotor to be mounted over shaft 21. When so mounted the drum encircles the annular core whereas the magnet is within the enclosure of the annular core. Where the indicator is required to respond rapidly, the inertia of the rotor is minimized by employing a drum of low mass. To retain the rotor so that it cannot slip off the shaft, a groove is provided adjacent the shaft's end for accommodating a C-shaped lock member 26. The shaft has an enlarged portion 21a, best shown in FIG. 3, which provides a shoulder against which hub 23 bears to thereby position the rotor so that the permanent magnet is aligned with the core 9 of the stator. In more sophisticated embodiments of the invention, ball or roller bearings can be employed to facilitate turning of the rotor.

FIG. 7 depicts a rudimentary stator having a pair of similar windings 30 and 31 disposed upon an annular ferromagnetic core 32. The windings are diametrically opposite one another and are arranged so that when an electrical signal is applied at terminal 33 both windings are electrically excited. Upon being electrically energized, winding 30 establishes a magnetic flux in the core whose direction is counter to the direction of the magnetic flux established by winding 31. If it is assumed that winding 30 causes its magnetic flux to flow clockwise as indicated by the M arrows in FIG. 7, then the magnetic flux established by the electrical current in winding 31 flows in the counterclockwise direction as indicated by the N arrows. Because of the directions of the fields established by the two windings, the magnetic flux is forced out of the core. The external magnetic field can be represented by a vector, such as the arrow X, whose direction is the direction of the external field and whose length is a measure of the external field's magnetic intensity. In the absence of any other external magnetic field, the permanent magnet of the rotor, indicated in phantom in FIG. 7, is constrained to rotate into alignment with the X vector. When so aligned, one of the symbols on the periphery of the drum is in register in the window of panel 1.

In the stator of FIG. 8 a second pair of diametrically opposed windings 34 and 35 are positioned upon annular core 32. The additional windings are connected to terminal 36 so that both windings are simultaneously electrically energized by a signal applied at terminal 36, the external magnetic field established by windings 34 and 35 is represented by the vector Y. The permanent magnet of the rotor will, when only windings 34 and 35 are energized, rotate into alignment with vector Y, and thereby bring another symbol on the drum into register in the window of the indicator. A third symbol can be positioned in the window of the indicator by simultaneously applying electrical signals at terminals 33 and 36. As both pairs of windings are then electrically excited, the external magnetic field is the resultant of the individual X and Y fields established by those windings. In FIG. 8, the resultant field is designated by the vector XY. The permanent magnet of the rotor is constrained to align itself with the XY vector and thereby position the drum so that the third symbol is placed in the indicator's window.

FIG. 4 depicts the stator that is employed to respond directly to binary coded electrical signals. The stator has five pairs of windings, each pair of windings being connected to establish an external magnetic field. For ease of exposition windings 11 and 12 are designated as A windings and when energized, establish an external magnetic field represented by vector A; windings 13 and 14 are designated B windings and when energized establish a magnetic field represented by vector B; windings 15 and 16 are designated C windings and when energized establish an external magnetic field represented by vector C; windings 17 and 18 are designated D windings and when energized, establish an external magnetic field represented by vector D; and when E windings 19 and 20 are energized, they establish an external magnetic field represented by vector E. The A, B, C, and D windings are "main" windings whereas E windings 19 and 20 are "auxiliary" windings. The windings are regularly spaced around the core 9.

The schematic arrangement of the windings is shown in FIG. 5 where the main windings A, B, C, D are indicated to be connected to the correspondingly designated terminals and the auxiliary windings are connected to terminal E. The stator of FIGS. 4 and 5 is particularly suited to cause the indicator to respond to a four bit binary code.

Referring to FIG. 6, the standard binary code is tabulated with respect to its decimal equivalent. The bits in the code are tabulated under columns headed A, B, C, D and for each decimal digit there is a four bit code. For example, the decimal digit 3 is represented by having bits A and B valued at ONE and bits C and D valued at ZERO. When the code is in the form of electrical signals, a bit having a value of ONE is customarily represented by a designated electrical voltage, for example +24 volts, whereas the value of ZERO is represented by ground potential or the absence of electrical voltage. From the table, it is apparent that for the decimal digit 0 all the bits, A, B, C, and D, are valued at ZERO. Further, it can be seen that for the decimal digit 7, bits A, B, and C are valued at ONE while bit D is valued at ZERO.

Where the coded electrical signals tabulated under columns A, B, C, D of FIG. 6 are applied to the correspondingly designated terminals in FIG. 5, magnetic fields represented by vectors A, B, AB, C, AC, BC, D, and AD are established. Vector A represents the magnetic field that is established by the stator when decimal numeral 1 is to be displayed in the window of the housing; vector B represents the magnetic field that is established when decimal numeral 2 is to be displayed; vector AB represents the magnetic field that is established when decimal numeral 3 is to be displayed; and so on. Since the binary ONE corresponds, for the purpose of exposition, to an electrical signal of +24 volts and the binary ZERO corresponds to an electrical signal at ground potential, the decimal digit 1 is displayed by the rotor when the A windings are energized and establish the A vector; the decimal digit 3 is displayed in the window of the indicator when the A and B windings are simultaneously energized to establish the AB vector; etc.

The decimal numerals 1, 2, 3, 4, 5, 6, 8, and 9 can be displayed by energizing one or, at most, two out of the four (A, B, C, D) pairs of main windings. For the decimal numeral 7, the binary code requires the A, B, and C windings to be energized by ONE signals. It has been found that the simultaneous energization of three or more pairs of windings results in erratic and uncertain operation of the indicator and it is an objective of the invention to avoid the simultaneous energization of more than two pairs of windings on the stator. To achieve that objective the switching arrangement shown in FIG. 10 is employed. The stator windings, 11 through 20, are diagrammatically indicated in the drawing and the terminals designated A, B, C, D, and E correspond to the correspondingly designated terminals of FIG. 5. The A, B, C, and D binary coded electrical signals are applied to terminals 37, 38, 39, and 40, respectively. As terminal 40 is directly connected to terminal D, the binary coded D signal is effectively applied directly to windings 17 and 18. Where the D signal is a binary ONE, windings 17 and 18 are energized and established the magnetic field represented by vector D; where the D signal is a binary ZERO, windings 17 and 18 are not energized. The binary code for the decimal digit 7 requires the D signal to be a ZERO and therefore windings 17 and 18 are not energized when the signals applied at terminals 37, 38, 39, and 40 are coded for the decimal digit 7. Terminal 37 provides one input to an EXCLUSIVE OR gate 41, whose output is applied to the A terminal of windings 11 and 12. Terminal 38 is connected to an input of an EXCLUSIVE OR gate 42 whose output is connected to terminal B of windings 13 and 14. Similarly, terminal 39 is connected to an input of an EXCLUSIVE OR gate 43 whose output is coupled to terminal C of windings 15 and 16. EXCLUSIVE OR gates 41, 42, 43 each have one input coupled to the output of an AND gate 44. Terminals 37, 38, and 39 provide three inputs into AND gate 44.

An EXCLUSIVE OR gate, such as gate 41, 42, or 43, is characterized by being uninhibited when the signal applied at either one of its two inputs is a ONE and being inhibited when the simultaneous signals at its inputs are both ONEs or are both ZEROs. Therefore, where both inputs of the EXCLUSIVE OR gate are simultaneously energized by ONE signals, the gate is inhibited and prevents any signal from passing through it. Where only one of the two inputs is a ONE signal, the gate is uninhibited and permits passage of the signal.

Where the signals applied at terminals 37, 38, and 39 are all ONEs, the three inputs to AND gate 44 are simultaneously energized and that gate emits a signal which energizes E windings 19 and 20 and simultaneously applies an energizing input to EXCLUSIVE OR gates 41, 42, and 43. The ONE signal impressed at terminal 37 cannot pass through gate 41 since both inputs of that OR gate are now simultaneously energized; similarly the ONE signals applied at terminals 38 and 39 are unable to pass through EXCLUSIVE OR gates 42 and 43. Because EXCLUSIVE OR gates 41, 42, and 43 are inhibited, the A, B, and C windings are not energized. The energization of the E windings, however, establishes a magnetic field represented by the E vector in FIGS. 5 and 9 and causes the decimal numeral 7 to be displayed in the window of the indicator.

Where the signals applied at terminals 37, 38, and 39 are not all ONEs, the three inputs to AND gate 44 are not simultaneously energized and the output of that gate then does not provide an energizing signal to EXCLUSIVE OR gates 41, 42, 43 or to the E windings. The EXCLUSIVE OR gates can pass signals from terminals 37, 38, and 39 to terminals A, B, and C, respectively, when the other input of the EXCLUSIVE OR gate is not energized by a signal from gate 44. Therefore, the A, B, and C windings can be energized by ONE signals applied at terminals 37, 38, or 39 so long as at least one of the A, B, C signals is a binary ZERO.

The gating arrangement of FIG. 10, in effect, permits electrical signals corresponding to the A, B, and C bits of the binary code (FIG. 5) to be applied to the A, B, and C windings (FIG. 4) of the stator so long as the A, B, and C signals are not all ONEs. Where those signals are all ONEs, the gating arrangement prevents the A, B, and C windings from being energized and instead causes the "auxiliary" E windings to be excited.

The binary code for the decimal digit 0, as shown in FIG. 6, requires that all the bits, A, B, C, and D, be valued at ZERO. As a ZERO signal is represented by the absence of an electrical potential, none of the stator windings, normally, would be energized and therefore a magnetic field would not normally be established. In order that the indicator may respond to the binary code although all the bits are ZEROs, the switching arrangement shown in FIG. 11 can be employed where the coded electrical signals are continuous in nature. By a "continuous" signal, it is meant that the signal persists for the entire time that a decimal numeral is to be displayed. "Continuous" signals, therefore, change only when a different numeral is to be displayed by the indicator. The A, B, C, and D electrical signals are applied as inputs to an OR gate 45 whose output is coupled to the input of an EXCLUSIVE NOR gate 46. The EXCLUSIVE NOR gate may consist simply of an EXCLUSIVE OR and an inverter which inverts the polarity of the EXCLUSIVE OR gate's output. The NOR gate has another input that is always energized by a positive potential applied at terminal 47. The output of the EXCLUSIVE NOR gate is connected to terminal C of windings 15 and 16, as indicated in FIG. 12 where the switching arrangement of FIG. 11 has been combined with the switching arrangement of FIG. 10.

OR gate 45 emits a positive potential from its output where one or more of the A, B, C, or D signals applied to its inputs is a binary ONE. In that condition of OR gate 45, both inputs of EXCLUSIVE NOR gate 46 are energized and the EXCLUSIVE NOR gate is therefore inhibited. The EXCLUSIVE NOR gate, while it is inhibited, provides no excitation to C windings 15 and 16 but permits those windings to be energized by a ONE signal applied at terminal 39. Where all the inputs to OR gate 45 are ZEROs, the OR gate ceases to emit an energizing signal to EXXCLUSIVE NOR gate 46. The EXCLUSIVE NOR gate, thereupon, is enabled by the positive potential at terminal 47 and the EXCLUSIVE NOR gate emits an inverted signal, that is, emits a negative signal which excites windings 15 and 16. The negative signal from the output of the EXCLUSIVE NOR gate causes the current in windings 15 and 16 to flow in the direction establishing a magnetic field represented by the vector Z in FIG. 9. Upon the establishment of that magnetic field, the rotor is constrained to rotate to a position where the decimal numeral 0 is displayed in the window of the indicator. The EXCLUSIVE NOR gate continues to emit a negative signal as long as all the inputs to OR gate 45 are ZEROs.

Where the coded electrical signals, A, B, C, and D, are pulses, the indicator is provided with magnetic detent elements of the type described in U.S. Patent No. 2,943,313, granted to Gordon et al. By employing the cylinder 71 and the ten magnetizable elements 73 shown in FIG. 3 of the Gordon et al. patent, the rotor of the indicator can be held in a position where the decimal numeral is in register in the window when the electrical pulse signals applied to the stator windings decay. Because it is desired to have the ten decimal digits uniformly spaced around the periphery of the drum 24 (FIG. 2), the windings on the stator are arranged to establish ten magnetic field vectors, as shown in FIG. 9, which are spaced at 36° intervals around the annular core. As each magnetic field vector is 180° opposite from another field vector, there may be a tendency for the rotor to "hang up" or move sluggishly when the stator causes one magnetic field to be replaced by a magnetic field whose vector is 180° displaced from the vector of the previously established field. Where static magnetizable elements are used, the elements are preferably positioned to pull the rotor to an offset position, as taught by Gordon et al., when the stator becomes electrically de-energized upon decay of the pulse signals. The provision of static magnetizable elements permits the binary coded signals to be pulses which need persist only for the time required for the rotor to align itself with the magnetic field established by the stator. The last numeral registered in the window will, then, remain in the window until a new set of coded signals causes a change in the display.

Where the coded electrical signals, A, B, C, and D, are pulses, the switching arrangement of FIG. 12 may be employed. However, instead of continuously applying a positive potential, impressed at terminal 47, to the input of EXCLUSIVE NOR gate 46, a positive pulse is applied at that terminal simultaneously with the pulse signals applied at terminals 37, 38, 39, and 40. The source that supplies the coded pulse signals usually supplies a clock pulse with each set of coded signals. A clock pulse is necessary to distinguish the time when the signals occur from the interval between pulses where one set of signals consists entirely of the absence of electrical potential. That is, where the code for the decimal numeral 0 could not otherwise be distinguished from the interval between signals, a clock pulse must be used to mark the set of signals characterizing the decimal numeral.

In the preferred embodiment of the invention, the vectors A, B, C, and E are of equal length whereas the D vector is reduced in magnitude so that it is about three-fifths as long as those other vectors. The windings are arranged to provide those vectors because it is desired to have the decimal numerals uniformly spaced around the periphery of the drum. Uniformity of spacing permits the decimal numerals to be of maximum height and therefore enhances the visibility of those numerals. Where uniformity of spacing of the numerals around the drum is not a desideratum, the windings of the stator may be arranged to establish magnetic field vectors which differ both in direction and in amplitude from the vectors depicted in FIGS. 4, 6, and 9.

Because variations in embodiments of the invention are possible in the light of the foregoing exposition, it is intended that the invention not be restricted to the details of construction and the arrangement specifically described or illustrated. For example, the logical gating arrangements depicted in FIG. 10, 11, and 12 are merely exemplary and it is obvious to those skilled in the art of signal gating that the results obtained from the illustrated arrangements can be achieved by other arrangements employing different logic elements. It is intended therefore that the scope of the invention be delimited by the appended claims and encompass such structure as do not in essence depart from the invention there defined.

What is claimed is:
1. In an electromagnetic indicator of the type utilizing
   a stator having electrically energizable windings mounted upon an annular ferromagnetic core for selectively establishing a plurality of discretely oriented magnetic fields, and
   a rotor having a salient pole magnet mounted to pivot within the annular core whereby the magnet rotates into alignment with the magnetic field established by the stator,
the improvement whereby the indicator responds to a set of simultaneous electrical signals coded in accordance with a binary system so that each signal in the set represents one bit in the binary code, the improvement residing in
   the stator having main and auxiliary windings connected in pairs to cause both windings of the pair to be simultaneously energized by an electrical signal,
   means for coupling each signal in the set to a different one of the main winding pairs, and
   switching means for causing an auxiliary pair of windings to be energized when the electrical signals in the set normally would energize more than two main winding pairs, the switching means preventing energization of the main windings.

2. The improvement according to claim 1, further including
   switching means for causing a pair of windings to be energized when the electrical signals in the set would normally not energize any of the main windings.

3. The improvement according to claim 1, further including
   switching means for causing a pair of main windings to be energized when the electrical signals in the set would normally not energize any of the main windings, the switching means causing the magnetic field established by the energized pair of windings to be opposite in direction to the magnetic field established by that pair of windings in response to an energizing signal of the set.

References Cited

UNITED STATES PATENTS 3,218,625　11/1965　Knotowicz _____ 340—325
3,289,199　11/1966　Watkins _____ 340—347

JOHN W. CALDWELL, *Primary Examiner.*

A. J. KASPER, *Assistant Examiner.*